(12) United States Patent
Kim et al.

(10) Patent No.: US 12,476,240 B2
(45) Date of Patent: Nov. 18, 2025

(54) MANUFACTURING APPARATUS AND MANUFACTURING METHOD OF ELECTRODE FOR SECONDARY BATTERY USING LASER, AND ELECTRODE FOR SECONDARY BATTERY MANUFACTURED BY THE SAME

(71) Applicant: LG Energy Solution, Ltd., Seoul (KR)

(72) Inventors: Taejong Kim, Daejeon (KR); Yujin Jeong, Daejeon (KR); Su Taek Jung, Daejeon (KR); Sangho Bae, Daejeon (KR); Seong Won Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 674 days.

(21) Appl. No.: 17/640,962

(22) PCT Filed: Sep. 16, 2020

(86) PCT No.: PCT/KR2020/012512
§ 371 (c)(1),
(2) Date: Mar. 7, 2022

(87) PCT Pub. No.: WO2021/132848
PCT Pub. Date: Jul. 1, 2021

(65) Prior Publication Data
US 2022/0344632 A1 Oct. 27, 2022

(30) Foreign Application Priority Data
Dec. 23, 2019 (KR) .................. 10-2019-0173412

(51) Int. Cl.
*H01M 4/04* (2006.01)
*B23K 26/08* (2014.01)
(Continued)

(52) U.S. Cl.
CPC ......... *H01M 4/0471* (2013.01); *B23K 26/362* (2013.01); *H01M 4/0404* (2013.01);
(Continued)

(58) Field of Classification Search
CPC ............. H01M 4/0471; H01M 4/0404; H01M 4/0435; H01M 4/13; H01M 4/139;
(Continued)

(56) References Cited

U.S. PATENT DOCUMENTS 7,138,210 B2  11/2006  Kim et al.
9,231,247 B2  1/2016  Ichikawa
(Continued)

FOREIGN PATENT DOCUMENTS

CN  103094521 A   5/2013
CN  203932198 U  11/2014
(Continued)

OTHER PUBLICATIONS

International Search Report for PCTKR2020012512 dated Jan. 4, 2021, 2 pgs.
(Continued)

*Primary Examiner* — Lisa S Park
(74) *Attorney, Agent, or Firm* — Lerner David LLP

(57) ABSTRACT

Provided are a manufacturing apparatus and a manufacturing method of an electrode for a secondary battery which forms a large number of holes in the electrode mixture having a level difference in thickness, by irradiating twice or less with a nanosecond laser, and an electrode for a secondary battery manufactured by the same.

13 Claims, 15 Drawing Sheets

(51) Int. Cl.
*B23K 26/082* (2014.01)
*B23K 26/362* (2014.01)
*H01M 4/02* (2006.01)
*H01M 4/13* (2010.01)
*H01M 4/139* (2010.01)

(52) U.S. Cl.
CPC ........... *H01M 4/0435* (2013.01); *H01M 4/13* (2013.01); *H01M 4/139* (2013.01); *H01M 2004/021* (2013.01)

(58) Field of Classification Search
CPC .............. H01M 2004/021; H01M 4/04; B23K 26/362; B23K 2101/36; B23K 2103/16; B23K 26/0821; B23K 26/0846; B23K 26/386; B23K 26/402; B23K 26/0622; B23K 26/382; Y02E 60/10
See application file for complete search history.

(56) References Cited

U.S. PATENT DOCUMENTS

| | | | |
|---|---|---|---|
| 10,622,621 | B2 | 4/2020 | Xiao et al. |
| 2011/0244144 | A1* | 10/2011 | Uchida .................... B05D 3/06 118/620 |
| 2015/0293371 | A1 | 10/2015 | Song et al. |
| 2017/0301955 | A1* | 10/2017 | Kwak ............... H01M 10/0585 |
| 2018/0287139 | A1 | 10/2018 | Xiao et al. |
| 2018/0337396 | A1 | 11/2018 | Kim |
| 2019/0074537 | A1 | 3/2019 | Yun |
| 2020/0313181 | A1* | 10/2020 | Kim ...................... H01M 4/139 |
| 2021/0090818 | A1* | 3/2021 | Aita ........................ H01M 4/70 |

FOREIGN PATENT DOCUMENTS

| | | | |
|---|---|---|---|
| CN | 105374985 | A | 3/2016 |
| CN | 108352502 | A | 7/2018 |
| CN | 108370023 | A | 8/2018 |
| CN | 108695486 | A | 10/2018 |
| EP | 3401984 | A2 | 11/2018 |
| JP | H09283116 | A | 10/1997 |
| JP | 3690522 | B2 | 8/2005 |
| JP | 2013097925 | * | 5/2013 |
| JP | 2013097925 | A | 5/2013 |
| JP | 5948941 | B2 | 7/2016 |
| JP | 2018160349 | * | 10/2018 |
| KR | 20130015398 | * | 2/2013 |
| KR | 20130101174 | A | 9/2013 |
| KR | 20130102711 | A | 9/2013 |
| KR | 20150079767 | A | 7/2015 |
| KR | 20160016040 | A | 2/2016 |
| KR | 20160143109 | A | 12/2016 |
| KR | 20170057953 | A | 5/2017 |
| KR | 20170094983 | A | 8/2017 |
| KR | 20170107921 | A | 9/2017 |

OTHER PUBLICATIONS

Kim, Y et al., "Improving Li-ion battery charge rate acceptance through highly ordered hierarchical electrode design", "Ionics", Feb. 2018, pp. 2935-2943.

Extended European Search Report including Written Opinion for Application No. 20907522.5 dated Aug. 10, 23, pp. 1-8.

Pfleging, W. "A review of laser electrode processing for development and manufacturing of lithium-ion batteries" The Journal Nanophotonics, De Gruyter, Feb. 2018, pp. 1-25, vol. 7, No. 3.

* cited by examiner

Example 1

Example 2

Comparative Example 1

Example 1

Example 2

Comparative Example 1

Hole diameter (r)

Hole depth (d)

MANUFACTURING APPARATUS AND MANUFACTURING METHOD OF ELECTRODE FOR SECONDARY BATTERY USING LASER, AND ELECTRODE FOR SECONDARY BATTERY MANUFACTURED BY THE SAME

CROSS-REFERENCE TO RELATED APPLICATIONS

This application is a national phase entry under 35 U.S.C. § 371 of International Application No. PCT/KR2020/012512, filed on Sep. 16, 2020, which claims priority from Korean Patent Application No. 10-2019-0173412 filed, on Dec. 23, 2019, the disclosures of which are incorporated herein by reference in their entirety.

TECHNICAL FIELD

The present disclosure relates to a manufacturing apparatus and a manufacturing method of an electrode for a secondary battery using a laser, and an electrode for a secondary battery manufactured by the same, and more particularly, to a manufacturing apparatus and a manufacturing method of an electrode for a secondary battery which forms a hole in the electrode mixture using a laser, and an electrode for a secondary battery manufactured by the same.

BACKGROUND ART

Due to the rapid increase in the use of fossil fuels, the demand for the use of alternative energy or clean energy is increasing, and as a part thereof, the fields that are being studied most actively are the fields of power generation and power storage using electrochemistry.

Currently, a secondary battery is a representative example of an electrochemical device that utilizes such electrochemical energy, and the range of use thereof tends to be gradually expanding.

Recently, with the increase of the technological development and demand for mobile devices such as portable computers, portable phones, and cameras, demand for secondary batteries as an energy source rapidly increases. Among such secondary batteries, many studies have been conducted on a lithium secondary battery that exhibits high energy density and operating voltage and has long cycle life and low self-discharge rate, and has been commercialized and widely used.

In addition, as interest in environmental issues grows, studies are frequently conducted on an electric vehicle, a hybrid electric vehicle, etc. which can replace a vehicle using fossil fuels such as a gasoline vehicle and a diesel vehicle, which are one of the main causes of air pollution. Although a nickel metal hydride secondary battery is mainly used as a power source for the electric vehicle and the hybrid electric vehicle, research on the use of a lithium secondary battery having high energy density and discharge voltage is actively being conducted, a part of which are in the commercialization stage.

In this way, as the demand for lithium secondary batteries rapidly increases and the usage time of the secondary batteries increases, the capacity of the secondary battery has increased and the electrode density has also increased. However, when enhancing the electrode density in order to increase the capacity in this way, the porosity is reduced, the bending degree is increased, and the movement path of lithium ions is increased, which causes a problem that the ion conductivity is decreased, and the power characteristics are decreased accordingly. That is, as the electrode density of the secondary battery is enhanced and the capacity is increased, the power characteristic decreases.

Nevertheless, as the area in which the lithium secondary battery is used is increasing, both high capacity and high power are required. Thus, there is an urgent need to develop a battery capable of high power by increasing ionic conductivity.

DETAILED DESCRIPTION OF THE INVENTION

Technical Problem

The present disclosure has been designed to solve the above-mentioned problems, and it is an object of the present disclosure to form a large number of holes in the electrode mixture by laser etching to reduce the bending degree, thereby improving power characteristics while minimizing capacity reduction of a secondary battery including the same.

Technical Solution

Terms and wordings used in this specification and claims must not be construed as being limited to the general or dictionary meanings thereof, and should be interpreted as having meanings and concepts matching the technical idea of the invention based on the principle that an inventor is able to appropriately define the concepts of the terms and wordings to describe the invention in the best way possible.

Hereinafter, according to one embodiment of the present disclosure, there is provided an apparatus for manufacturing an electrode for a secondary battery, comprising:

- a roller-shaped unwander on which a sheet type current collector is wound;
- a transfer unit that continuously transfers the sheet type current collector;
- a coating unit that coats an electrode active material slurry on at least one surface of the sheet type current collector;
- a drying unit that dries the coated electrode active material slurry to form an electrode mixture on at least one surface of a sheet type current collector;
- a rolling unit that rolls the electrode mixture through a pair of rollers;
- a laser unit in which the electrode mixture is subjected laser etching to form a large number of holes having a level difference in thickness, thereby manufacturing an electrode sheet; and,
- a roller-shaped reminder that rewinds the electrode sheet, wherein the laser unit is a nanosecond laser, and forms respective holes by performing irradiation twice or less.

At this time, the transfer unit may transfer the sheet type current collector at a speed of 40 m/min to 80 m/min.

Meanwhile, the nanosecond laser may satisfy the following conditions 1 to 4.

[Condition 1]
Average Power: 26 W to 100 W,
[Condition 2]
Repetition Rate: 28 kHz to 70 kHz,
[Condition 3]
Pulse Duration: 55 ns to 220 ns,
[Condition 4]
Pulse Energy: 0.28 mJ to 2.84 mJ.

The plurality of holes formed by laser etching may be formed in a conical shape whose diameter decreases in the direction of the sheet type current collector from the surface portion of the electrode mixture.

At this time, the holes may be formed such that a diameter at the surface portion of the electrode mixture and a depth in the direction of the sheet type current collector from the surface portion of the electrode mixture is in a ratio of 1:1 to 2:1.

Further, the diameter of the hole at the surface portion of the electrode mixture may be formed from 10 μm to 50 μm, and an interval between the respective holes may be formed from 100 μm to 500 μm, based on a conical interval between the respective holes located at a portion close to the current collector.

Moreover, the laser unit further includes a polygon mirror and thus, can etch through the polygon mirror at the time of laser etching.

According to another embodiment of the present disclosure, there is provided a method for manufacturing an electrode for a secondary battery, the method comprising the steps of:
(a) preparing an electrode slurry containing an active material;
(b) coating the electrode slurry onto at least one surface of a sheet type current collector to be transferred, and drying the same to form an electrode mixture, and rolling the electrode mixture; and
(c) subjecting the electrode mixture to laser etching to form a large number of holes having a level difference in thickness, thereby manufacturing an electrode sheet;
wherein step (c) performs irradiation twice or less with a nanosecond laser to form respective holes.

Here, the sheet type current collector can be transferred at a speed of 40 m/min to 80 m/min.

Meanwhile, the nanosecond laser can satisfy the following conditions 1 to 4.
[Condition 1]
Average Power: 26 W to 100 W,
[Condition 2]
Repetition Rate: 28 kHz to 70 kHz,
[Condition 3]
Pulse Duration: 55 ns to 220 ns,
[Condition 4]
Pulse Energy: 0.28 mJ to 2.84 mJ.

The large number of holes formed by laser etching may be formed in a conical shape whose diameter decreases in the direction of the sheet type current collector from the surface portion of the electrode mixture, and a diameter at the surface portion of the electrode mixture and a depth in the direction of the sheet type current collector from the surface portion of the electrode mixture may be formed in a ratio of 1:1 to 2:1.

Further, the diameter of the holes at the surface portion of the electrode mixture may be specifically formed from 10 μm to 50 μm, and the interval between the respective holes may be formed from 100 μm to 500 μm, based a conical interval between the respective holes located in a portion close to the current collector.

Moreover, the laser unit further includes a polygon mirror and thus, can etch through the polygon mirror at the time of laser etching.

According to yet another embodiment of the present disclosure, there is provided an electrode for a secondary battery, which is manufactured by the method of manufacturing an electrode, the electrode being characterize in that: an electrode mixture is formed on at least one surface of a current collector, and a large number of conical-shaped holes, in which a diameter at the surface portion of the electrode mixture and a depth in the direction of the sheet type current collector from the surface portion of the electrode mixture is in a ratio of 1:1 to 2:1, are formed in the electrode mixture so as to form a level difference in thickness.

At this time, as described above, the diameter of the hole at the surface portion of the electrode mixture may be 10 μm to 50 and the interval between the respective holes may be 100 μm to 500 μm.

Advantageous Effects

In the manufacturing apparatus and the manufacturing method of an electrode for a secondary battery according to the present disclosure, a large number of holes having a level difference in thickness can be formed by using a laser in the electrode mixture to reduce the bending degree, thereby manufacturing an electrode with increased ionic conductivity, whereby the method provides the effects of improving the power characteristics and high rate characteristics of the secondary battery including the same.

In the manufacturing apparatus and the manufacturing method of an electrode for a secondary battery according to the present disclosure, holes having a desired diameter and depth can be formed by performing irradiation twice or less, in consideration of the electrode process speed, thereby providing the effect of minimizing the loss of capacity.

DETAILED DESCRIPTION OF THE EMBODIMENTS

Hereinafter, the present disclosure will be described in more detail.

According to one embodiment of the present disclosure, there is provided an apparatus for manufacturing an electrode for a secondary battery, comprising:

a roller-shaped unwinder on which a sheet type current collector is wound;

a transfer unit that continuously transfers the sheet type current collector;

a coating unit that coats an electrode active material slurry on at least one surface of the sheet type current collector;

a drying unit that dries the coated electrode active material slurry to form an electrode mixture on at least one surface of a sheet type current collector;

a rolling unit that rolls the electrode mixture through a pair of rollers;

a laser unit in which the electrode mixture is subjected laser etching to form a large number of holes having a level difference in thickness, thereby manufacturing an electrode sheet; and, a roller-shaped rewinder that rewinds the electrode sheet, wherein the laser unit is a nanosecond laser, and forms respective holes by performing irradiation twice or less.

In the following, the electrode manufacturing apparatus of the present disclosure will be described in detail with reference to the accompanying drawings so that those of ordinary skill in the art can easily carry out the invention. However, the following drawings are merely one example, and the present disclosure can be embodied in various different forms within the scope of the present disclosure and is not limited to the drawings.

Figure 1:
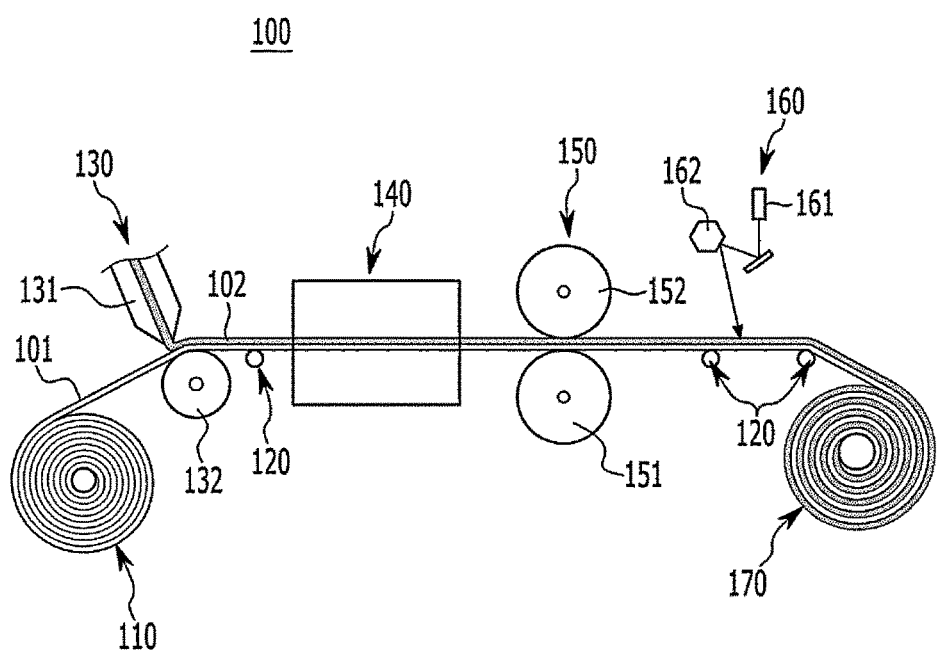
FIG. 1 is a schematic diagram of a manufacturing apparatus of an electrode for a secondary battery according to one embodiment of the present disclosure.
Figure 2:
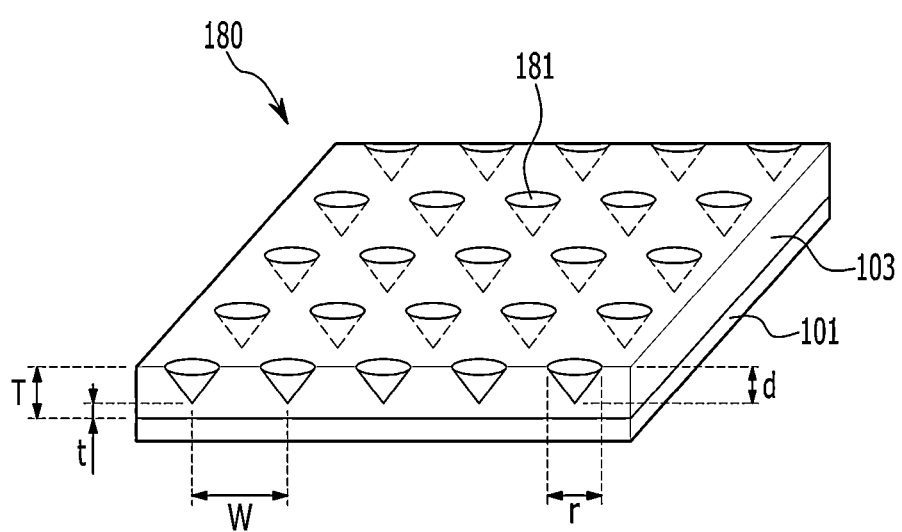
FIG. 2 is a schematic diagram of an electrode manufactured according to one embodiment of the present disclosure.

Specifically, FIG. 1 schematically illustrates such an electrode manufacturing apparatus, and FIG. 2 schematically illustrates an electrode manufactured by such a manufacturing method.

Referring to FIGS. 1 and 2, the electrode manufacturing apparatus according to the present disclosure includes:

a roller-shaped unwinder 110 on which a sheet type current collector 101 is wound;

a transfer unit 120 that continuously transfers the sheet type current collector 101;

a coating unit 130 that coats an electrode active material slurry 102 onto at least one surface of the sheet type current collector 101;

a drying unit that dries the coated electrode active material slurry 102 to form an electrode mixture 103 on at least one surface of a sheet type current collector 101;

a rolling unit 150 that rolls the electrode mixture 103 through a pair of rollers 151 and 152;

a laser unit 160 in which the electrode mixture 103 is subjected to laser etching to form a large number of holes 181 having a level difference T-t in thickness, thereby manufacturing an electrode sheet 180; and, a roller-shaped rewinder 170 that rewinds the electrode sheet 180.

Hereinafter, the components of the electrode manufacturing apparatus will be described in detail.

First, the unwinder 110 is composed of a structure in which the sheet type current collector 101 is wound on a roll.

This unwinder 110 unwinds the sheet type current collector 101 and transfers the sheet-type current collector 101 by the transfer unit 120.

The transfer unit 120 receives the sheet type current collector 101 unwound from the unwinder 110, and serves to transfer the sheet type current collector 101 to a rewinder 170 via a coating unit 130, a drying unit 140, a rolling unit 150, and a laser unit 160.

Here, the transfer unit 120 may be a roll.

By such a transfer unit 120, the sheet type current collector 101 may be transferred, for example, at a speed of 40 m/min to 80 m/min, and specifically, it can be transferred at a speed of 60 m/min to 80 m/min.

It is commercially meaningful when the speeds in the above range are satisfied.

If the transfer proceeds at a very fast speed beyond the above range, problems can occur when performing each step, for example, coating or drying of the electrode active material slurry, or rolling of the electrode mixture may not be performed properly. On the other hand, if the transfer proceeds at a very slow speed, it is not possible to obtain a commercially meaningful electrode manufacturing speed, which is thus not preferable.

Next, the sheet type current collector 101 unwound from the unwinder 110 and transferred by the transfer unit 120 is transferred to the coating unit 130 by the transfer unit 120.

The coating unit 130 coats the electrode active material slurry 102 onto the sheet type current collector 101.

At this time, the coating unit is not limited as long as it is in a form capable of coating the electrode active material slurry, and it may be coated by a conventionally known coating device such as a coating die, a coating roll, or a slide-slot. FIG. 1 shows, as an example, a structure in which an electrode active material slurry is coated via a coating die.

Specifically, the coating unit 130 may be composed of a structure including: a coating die 131 provided with an outlet slot so that the electrode active material slurry 102 flows out to the outside toward the sheet type current collector 101, and a coater roll 132 which is arranged separately from the outlet slot of the die 131 at predetermined intervals, and transfers the sheet type current collector 101 by rotation so that the electrode active material slurry 102 can be coated onto the sheet type current collector 101 by the coating die 131.

Thereafter, the sheet type current collector 101 coated with the electrode active material slurry 102 is transferred to the drying unit 140 by the transfer unit 120.

The drying unit 140 is not limited as long as it is a device capable of forming the electrode mixture 103 by evaporating a solvent from the electrode active material slurry. It may have any conventionally known structure, and for example, the drying can be performed by a heating type and/or a hot air type.

When passing through such as drying unit 140, the electrode mixture 103 in a state where the solvent is evaporated is formed on the sheet type current collector 101, and the electrode mixture 103 is rolled through the rolling unit 150 so as to have an appropriate porosity and electrode density.

As long as the rolling unit 150 is in a form capable of rolling the electrode mixture, its device, structure, and the like are not limited, and for example, it may be in the form of rolling by adjusting the separation interval of the pair of rollers 151 and 152.

The electrode mixture 103 on which the rolling has been completed is transferred to the laser unit 160 by the transfer unit 120, and the laser unit 160 forms a large number of holes 181 having a level difference T-t in thickness by etching the electrode mixture 103 using a laser.

At this time, the laser unit 160 uses a nanosecond laser 161, and forms respective holes 181 by performing irradiation twice or less, and specifically, by performing irradiation once.

In order to exhibit the effect according to the present disclosure, as the diameter (r) at the surface portion of the electrode mixture 103 is smaller and as the depth (d) in the direction of the sheet type current collector from the surface portion of the electrode mixture is deeper within the range of not damaging the sheet type current collector 101, the bending degree can be reduced while minimizing the reduction in capacity, which is preferable.

In this regard, when a level difference in thickness is formed in a hole shape, not only the depth can be formed deeper by 2 times as compared with the case of forming a line shaped level difference, but also it is also superior in terms of electrode process speed. Therefore, in order to exhibit the effect of the present disclosure by performing irradiation twice or less, it must be formed in a hole shape.

Further, if the number of irradiations is increased by 3 or more beyond the above range, the diameter of the hole becomes larger, the deviation becomes severe, the temperature rises due to the laser energy, so that the separation of the electrode mixture is increased and the capacity is reduced, while further processing in the depth direction is insignificant. Therefore, it is not desirable to obtain all the desired effects of the present disclosure, and further, there is a problem in that a burr may occur.

Moreover, when using a femtosecond or picosecond laser without using a nanosecond laser, the desired hole diameter and depth can be obtained only when the laser is irradiated several times on the electrode mixture. Performing irradiation twice or less allows the energy to spread widely, so that a spreading shaped hole are formed in which the depth of the hole is shallow and the diameter is wide.

In this case, the loss of the electrode mixture becomes large, which leads to a reduction in the capacity of the secondary battery including the same, and thus is not preferable.

On the other hand, the transfer speed of the transfer unit in the manufacturing process of the electrode according to the present disclosure is preferably 40 m/min to 80 m/min. Thus, in the case of performing irradiation with a femtosecond or picosecond laser several times in order to form holes of desired shape of the present disclosure, it is almost impossible to accurately irradiate one portion with a laser several times, and as a result, it is difficult to form a hole having a small deviation due to a shape in which the hole spreads widely.

In addition, in the case of enhancing the average power of femtosecond and picosecond lasers, a desired degree of hole depth can be obtained, but at the same time, the size of the diameter also increases, the loss of capacity becomes larger, and the positional deviation is large, which is thus not appropriate.

In conclusion, in order to obtain the effect according to the present disclosure, the optimum hole shape must be obtained, and for this purpose, the nanosecond laser must be irradiated twice or less, specifically once, to form a level difference in thickness.

Further, in order to maximize the effect according to the present disclosure, the nanosecond laser can, specifically, satisfy the following conditions 1 to 4.

[Condition 1]
Average Power: 26 W to 100 W,
[Condition 2]
Repetition Rate: 28 kHz to 70 kHz,
[Condition 3]
Pulse Duration: 55 ns to 220 ns,
[Condition 4]
Pulse Energy: 0.28 mJ to 2.84 mJ.

If any of the above conditions are not satisfied, it is not possible to form a hole having a shape optimized for exhibiting the effect of the present disclosure, which is thus not preferable.

Specifically, when the average power is too small, the hole is not formed properly, and when the average power exceeds the above range, the diameter of the formed hole becomes too large and the battery capacity is reduced, which is thus not preferable.

In addition, when the repetition rate is too small, the average power is lowered and the hole is not formed properly, and when the repetition rate is too large, there is a problem that the diameter of the hole becomes too large.

Similarly, when the pulse duration is too small, there is a problem that the peak power becomes too high and a phenomenon of spreading energy occurs, and the diameter is formed more than 3 times the depth, like a picosecond laser. When the pulse duration is too large, the peak power becomes small and the hole is not formed properly.

Further, when the pulse energy is too small outside the above range, the peak power becomes smaller and the hole is not properly formed. When the pulse energy becomes too large, the peak power becomes too large, and the hole depth and diameter increases at the same time, so that the capacity loss becomes larger than the improvement of the power characteristics, which is thus not preferable.

On the other hand, when forming holes 181 in the electrode mixture 103 by using the nanosecond laser as described above, the holes 181 may be formed in a conical shape whose diameter decreases in the direction of the sheet type current collector 101 from the surface portion of the electrode mixture 103.

Further, as described above, in order to exhibit the effect according to the present disclosure, as the diameter (r) of the hole is smaller and as the depth (d) is deeper within the range of not damaging the sheet type current collector 101, it is more preferable. Therefore, the holes 181 may be formed such that the diameter (r) at the surface portion of the electrode mixture 103 and the depth (d) in the direction of the sheet-shaped current collector 101 from the surface portion of the electrode mixture 103 have the same size, or the diameter (r) may be greater than the depth (d). Specifically, the diameter (r) and the depth (d) of the hole 181 may be formed in a ratio of 1:1 to 2:1, specifically, a ratio of 1:1 to 1.7:1, more specifically, a ratio of 1:1 to 1.5:1, most specifically, a ratio of 1:1 to 1.3:1.

When the diameter (r) of the hole increases too much beyond the above range, the capacity decreases with the loss of the electrode mixture, which is thus not preferable, and when the depth (d) is too shallow, the effect of improving the power characteristics is insignificant, which is thus not preferable.

Specifically, the diameter (r) at the surface portion of the electrode mixture of the hole 181 may be formed in a range of 10 μm to 50 μm, specifically, 20 μm to 45 μm, and more specifically 25 μm to 35 μm.

When the diameter (r) is too large beyond the above range, there is a problem that a reduction in capacity due to the loss of the electrode mixture appears, and forming holes to be smaller than the above range is difficult in a process.

Furthermore, in order to more effectively exhibit the intended effect of the present disclosure, the interval between the respective holes 181 may be formed in the range of 100 μm to 500 μm, specifically 200 μm to 400 μm, and more specifically 200 μm to 300 μm.

Further, as confirmed by the present inventors, the interval (w) between the holes 181 also affects the diameter (r) and depth (d) of the formed holes.

Specifically, as the interval (w) between the holes 181 is smaller, the diameter (r) and the depth (d) of the holes is larger.

Therefore, when the interval (w) is too small outside the above range, the electrode binder is melted by a heat of the laser, so that the adhesion force between the electrode and the current collector, and the electrode adhesion force are lowered, so the possibility of separation of the electrode active material is high, and the current collector may be deformed by heat. When the interval is larger than the above range, the effect of improving the power characteristics is slight.

On the other hand, the laser unit 160 may further include a polygon mirror 162, and at the time of laser etching, it may be etched through the polygon mirror 162.

In this way, when the polygon mirror 162 is used, the holes 181 can be formed at a higher speed even with a single laser source, which is more preferable when applied to a mass production process.

Finally, the electrode sheet 180, which has been subjected to laser etching in the laser unit 160 to form a large number of holes 181, is wound by a roller-shaped rewinder 170.

The rewinder 170 is composed of a structure in which the electrode sheet 180 is wound on a roll, similar to the unwinder 110.

Moreover, according to another embodiment of the present disclosure, there is provided a method of manufacturing an electrode for a secondary battery, the method comprising the steps of:

(a) preparing an electrode slurry containing an active material;
(b) coating the electrode slurry onto at least one surface of a sheet type current collector to be transferred, and drying the same to form an electrode mixture, and rolling the electrode mixture; and
(c) subjecting the electrode mixture to laser etching to form a large number of holes having a level difference in thickness, thereby manufacturing an electrode sheet, wherein step (c) performs irradiation twice or less with a nanosecond laser to form respective holes.

The electrode active material slurry of step (a) contains the active material as described above.

The type of the active material is determined depending on whether the electrode is a positive electrode or a negative electrode.

For example, when the electrode is a positive electrode, the active material is not limited, and examples thereof include $LiCoO_2$, $LiNiO_2$, $LiMnO_2$, $LiMn_2O_2$, $Li(Ni_aCo_bMn_c)O_2$ (0<a<1, 0<b<1, 0<c<1, a+b+c=1), $LiNi_{1-d}Co_dO_2$, $LiCo_{1-d}Mn_dO_2$, $LiNi_{1-d}Mn_dO_2$ (0≦d<1), $Li(Ni_aCo_bMn_c)O_4$ (0<a<2, 0<b<2, 0<c<2, a+b+c=2), $LiMn_{2-e}Ni_eO_4$, $LiMn_{2-e}Co_eO_4$ (0<e<2), $LiCoPO_4$, $LiFePO_4$, or the like, and any one or a mixture of two or more of them may be used.

When the electrode is a negative electrode, the active material may include, for example, carbonaceous materials such as artificial graphite, natural graphite, graphitized carbon fibers and amorphous carbon; metallic compounds capable of alloying with lithium, such as Si, Al, Sn, Pb, Zn, Bi, In, Mg, Ga, Cd, Si alloy, Sn alloy or Al alloy; metal oxides capable of doping and undoping lithium, such as $SiO_x$ (0<x<2), $SnO_2$, vanadium oxide and lithium vanadium oxide; or a composite including the above metallic compound and the carbonaceous material such as a Si—C composite or a Sn—C composite, or the like, and any one or a mixture of two or more of them may be used. In addition, a metal lithium thin film may also be used as the negative electrode active material. Further, both low crystalline carbon and high crystalline carbon may be used as the carbon material. Typical examples of the low crystalline carbon may be soft carbon and hard carbon. Typical examples of the high crystalline carbon may be amorphous, planar, flaky, spherical or fibrous natural or artificial graphite, Kish graphite, pyrolytic carbon, mesophase pitch based carbon fiber, meso-carbon microbeads, mesophase pitches, and high-temperature calcined carbon such as petroleum or coal tar pitch derived cokes.

The electrode active material slurry may further include a conductive material and a binder, and optionally, may further include a filler.

The conductive material is used to impart conductivity to the electrode, and the conductive material can be used without particular limitation as long as it has electronic conductivity without causing chemical changes in the battery to be configured. Specific examples thereof include carbon-based materials such as carbon black, acetylene black, ketjen black, channel black, furnace black, lamp black, thermal black and carbon fiber; graphite such as natural graphite and artificial graphite; metal powder or metal fibers such as copper, nickel, aluminum and silver; conductive whiskey such as zinc oxide and potassium titanate; conductive metal oxides such as titanium oxide; or a conductive polymer such as a polyphenylene derivative, and any one alone or a mixture of two or more of them may be used. In particular, it is preferable to use carbon nanotube, which is because the material has good conductivity, thereby being able to minimize the content of the conductive material. The conductive material may be included in an amount of 0.5% to 10% by weight, specifically 1% to 5% by weight, based on the total weight of the respective positive electrode mixture.

The binder plays a role of improving adhesion between the positive electrode active material particles and adhesion force between the positive electrode active material and the current collector. Specific examples include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluororubber, or various copolymers thereof, and any one alone or a mixture of two or more of them may be used. The binder may be included in an amount of 0.5% to 10% by weight, specifically 1% to 5% by weight, based on the total weight of the respective positive electrode mixture.

When the conductive material and the binder are contained in a very large amount beyond the above range, the content of the positive electrode active material is relatively reduced, and the capacity and energy density are lowered.

When the conductive material and the binder are contained in a very small amount, it is difficult to exhibit conductivity and binding properties, which is not preferable.

The filler is optionally used as a component for inhibiting the expansion of positive electrode. The filler is not particularly limited so long as it is a fibrous material without causing chemical changes in the corresponding secondary battery. Examples of the filler include olefin-based polymers such as polyethylene and polypropylene; and fibrous materials such as glass fiber and carbon fiber. The filler may be added in an amount of 0.1 to 3% by weight based on the total weight of each positive electrode mixture.

The sheet type current collector on which electrode active material slurry is coated in step (b) is not particularly limited as long as it has conductivity while not causing chemical changes in the battery, and for example, copper, stainless steel, aluminum, nickel, titanium, calcined carbon, or aluminum or stainless steel having a surface treated with carbon, nickel, titanium, silver, etc. may be used. In addition, the sheet type current collector may have a thickness of 3 μm to 500 μm, and may have fine irregularities formed on the surface of the current collector to increase the adhesion force of the positive electrode active material. For example, it may be used in various forms such as films, sheets, foils, nets, porous bodies, foams, and nonwoven fabrics.

The process of coating, drying, and rolling the electrode active material slurry on the sheet type current collector is as described above, and the transfer speed of the sheet type current collector is also as described above.

In step (c), the step of subjecting the electrode mixture to laser etching to form a large number of holes having a level difference in thickness, thereby manufacturing an electrode sheet is also as described above.

Specifically, the respective holes can be formed by performing irradiation twice or less with a nanosecond laser, and the following conditions 1 to 4 can be satisfied.

[Condition 1]
Average Power: 26 W to 100 W,
[Condition 2]
Repetition Rate: 28 kHz to 70 kHz,
[Condition 3]
Pulse Duration: 55 ns to 220 ns,
[Condition 4]
Pulse Energy: 0.28 mJ to 2.84 mJ.

Further, the holes may be formed in a conical shape whose diameter decreases in the direction of the sheet type current collector from the surface portion of the electrode mixture, and the diameter at the surface portion of the electrode mixture and the depth in the direction of the sheet type current collector from the surface portion of the electrode mixture may be formed in a ratio of 1:1 to 2:1.

Moreover, the holes may be formed such that the diameter at the surface portion of the electrode mixture is 10 μm to 50 μm, and the interval between respective holes is 100 μm to 500 μm.

Further, at the time of laser etching, a polygon mirror may be used together.

Meanwhile, according to another embodiment of the present disclosure, there is provided an electrode for a secondary battery, which is manufactured by the method of manufacturing the electrode, the electrode being characterized in that:

an electrode mixture is formed on at least one surface of a current collector, and a large number of conical-shaped holes, in which a diameter at the surface portion of the electrode mixture and a depth in the direction of the sheet type current collector from the surface portion of the electrode mixture is in a ratio of 1:1 to 2:1, are formed in the electrode mixture so as to form a level difference in thickness.

The cone-shaped hole may be formed such that the diameter and the depth is specifically in a ratio of 1:1 to 1.7:1, more specifically, a ratio of 1:1 to 1.5:1, and most specifically, a ratio of 1:1 to 1.3:1.

Further, the diameter at the surface portion of the electrode mixture of the hole may be 10 μm to 50 μm, specifically 20 μm to 45 μm, and more specifically 25 μm to 35 μm.

Furthermore, in order to more effectively exhibit the intended effect of the present disclosure, the interval between the respective holes may be 100 μm to 500 μm, specifically 200 μm to 400 μm, and more specifically 200 μm to 300 μm.

The electrode may be a positive electrode or a negative electrode, and the above-mentioned holes may be formed on both the positive electrode or the negative electrode. When the above holes are formed on the positive electrode and used, high rate discharge characteristics can be improved, and when the holes are formed on the negative electrode and used, the characteristics advantageous for rapid charging can be exhibited, high-rate characteristics of the secondary battery can be improved regardless of which side is formed.

The present disclosure will be described in detail by way of examples so that those of ordinary skill in the art can easily carry out the invention. However, the present invention may be embodied in various different forms and is not limited to the examples described herein.

Production Example

Artificial graphite was used as an active material, SBR was used as a binder, carbon black was used as a conductive material, and CMC was used as an additive. Electrode active material:binder:conductive material:additive were added in a weight ratio of 96:0.5:2.5:1 to water to obtain an electrode active material slurry, and the obtained slurry was coated onto a Cu foil current collector with a thickness of about 130 μm and a loading amount of 250 mg/25 cm$^2$, dried, and then rolled to manufacture a preliminary negative electrode having a negative electrode mixture formed therein.

Example 1

The negative electrode mixture of the preliminary negative electrode manufactured in Production Example was irradiated once at 100 μm intervals by using a nanosecond laser (SPI G4, 1064 nm) and setting the following conditions to form a plurality of holes, thereby manufacturing a negative electrode
Average Power: 49 W (98% power),
Repetition Rate: 70 kHz
Pulse Duration: 220 ns,
Pulse Energy: 0.71 mJ
Laser Irradiation Time: 1 μs,
Wavelength: 1064 nm Example 2

A negative electrode was manufactured by forming the holes in the same manner in Example 1, except that the interval between the holes was set to 200 μm.

Comparative Example 1

A negative electrode was manufactured by forming the holes in the same manner in Example 1, except that the interval between the holes was set to 200 μm and irradiation was performed 3 times to form a large number of holes Experimental Example 1

Figure 3:
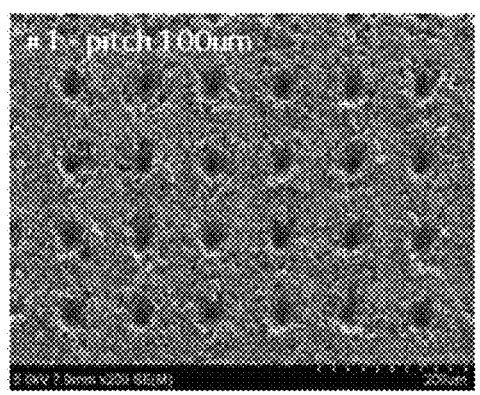
FIG. 3 is the plan-view SEM images of the positive electrode according to Experimental Example 1.
Figure 3:
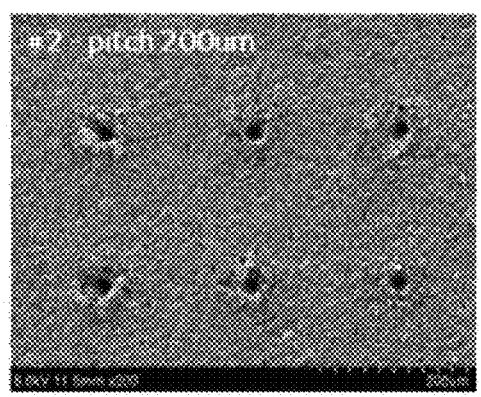
Figure 3:
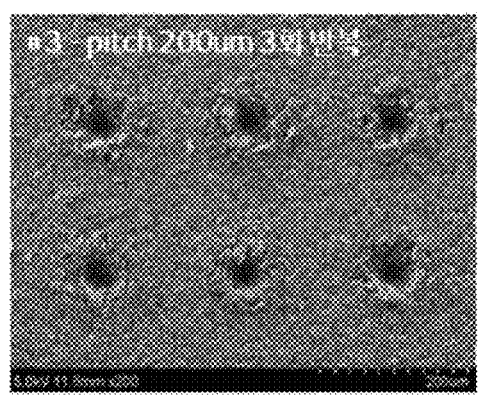
Figure 4:
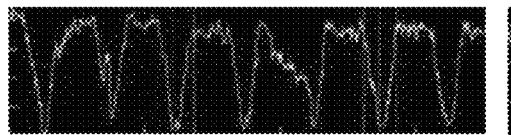
FIG. 4 is graphs obtained measuring a hole depth and a hole diameter according to Experimental Example 1 with a non-contact optical profiler.
Figure 4:
Figure 4:
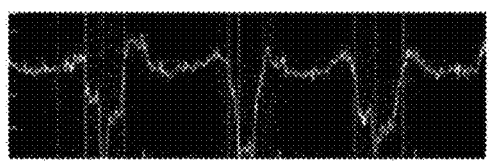

Plan-view SEM images of the positive electrodes manufactured in Examples 1 to 2 and Comparative Example 1 were taken, and shown in FIG. 3. The hole depth and the hole diameter (diameter on a plane) were measured with a non-contact optical profiler, and the results are shown in FIG. 4. The distribution diagram of the hole depth and the hole diameter is shown in FIG. 5 below.

Figure 5:
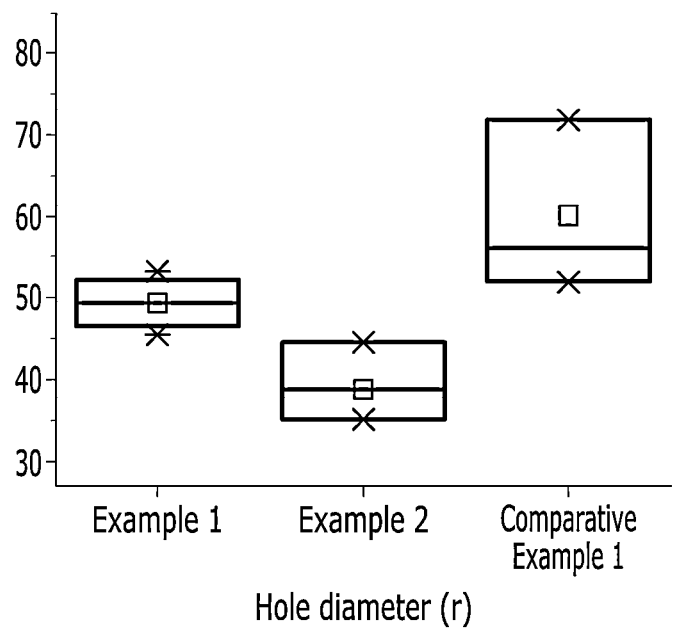
FIG. 5 is graphs showing a distribution diagram of hole depth and hole diameter according to Experimental Example 1.
Figure 5:
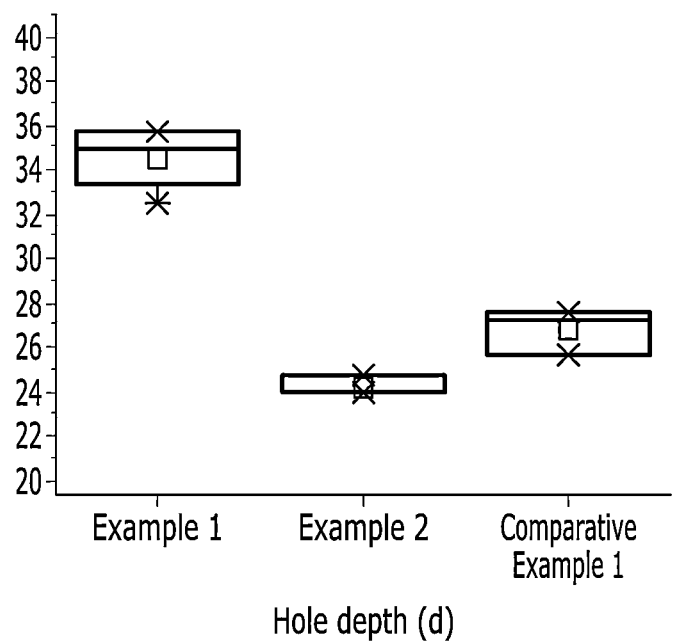
Figure 6:
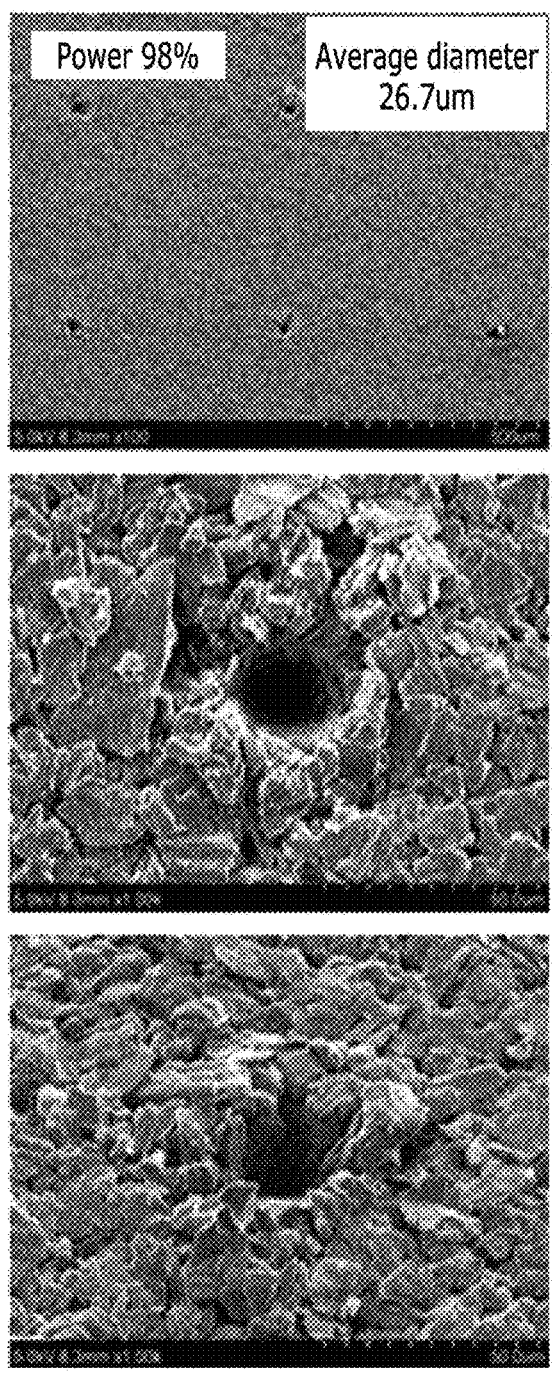
FIG. 6 is plan-view SEM images of the positive electrode of Example 3 according to Experimental Example 2.
Figure 7:
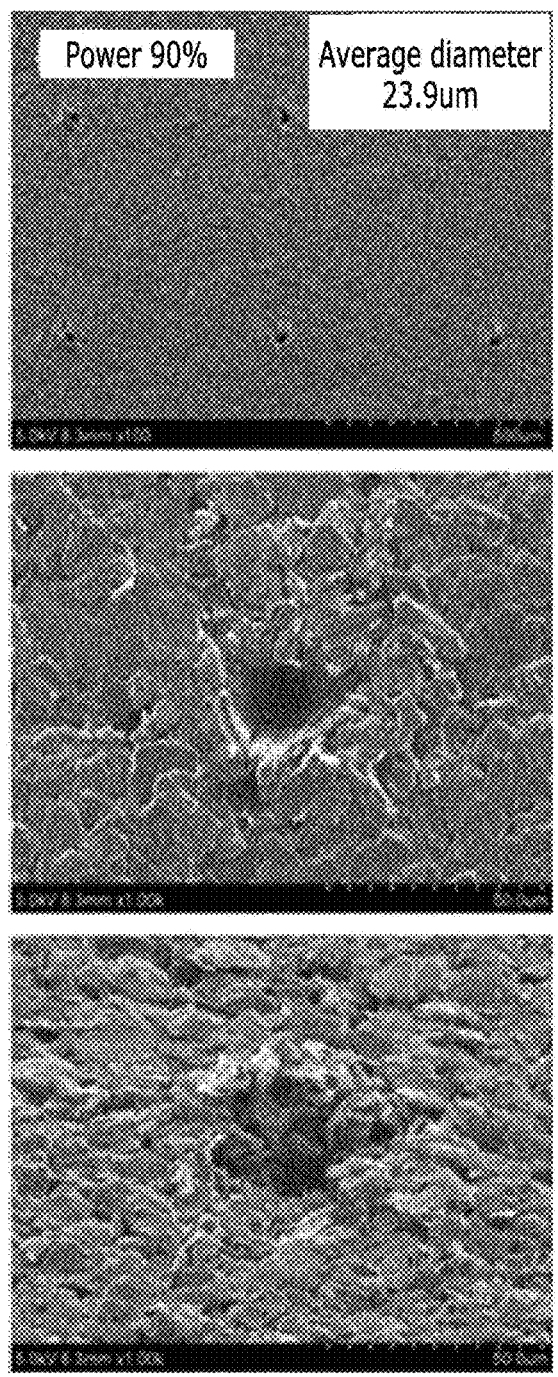
FIG. 7 is plan-view SEM images of the positive electrode of Example 4 according to Experimental Example 2.
Figure 8:
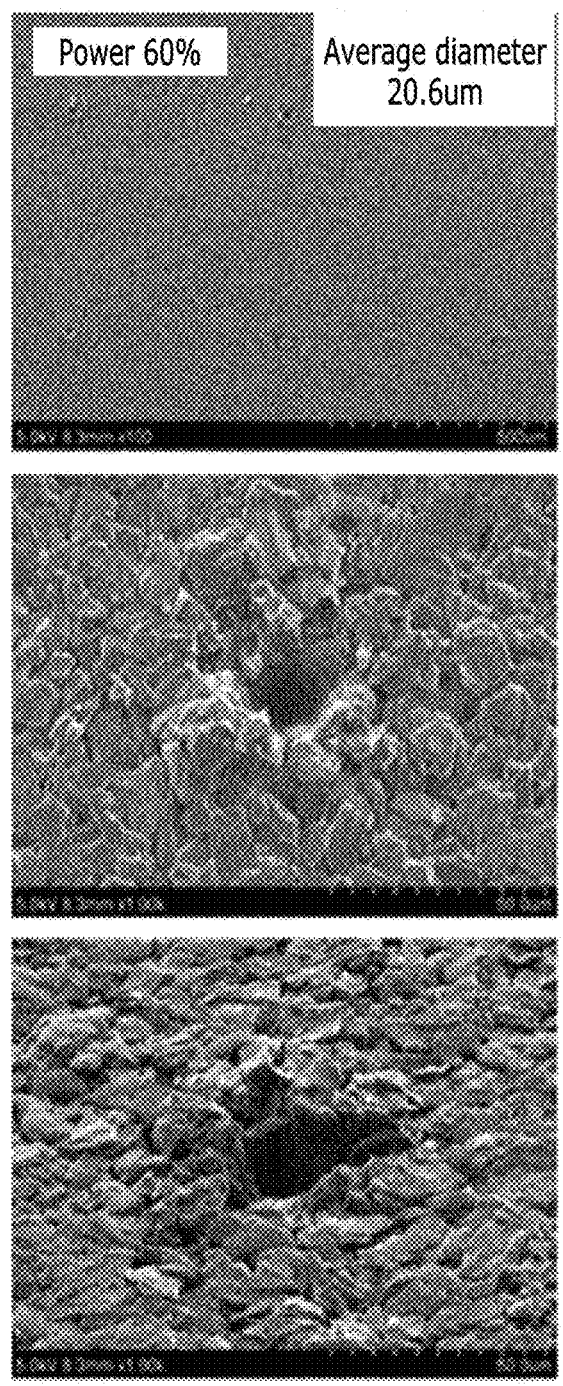
FIG. 8 is plan-view SEM images of the positive electrode of Example 5 according to Experimental Example 2.
Figure 9:
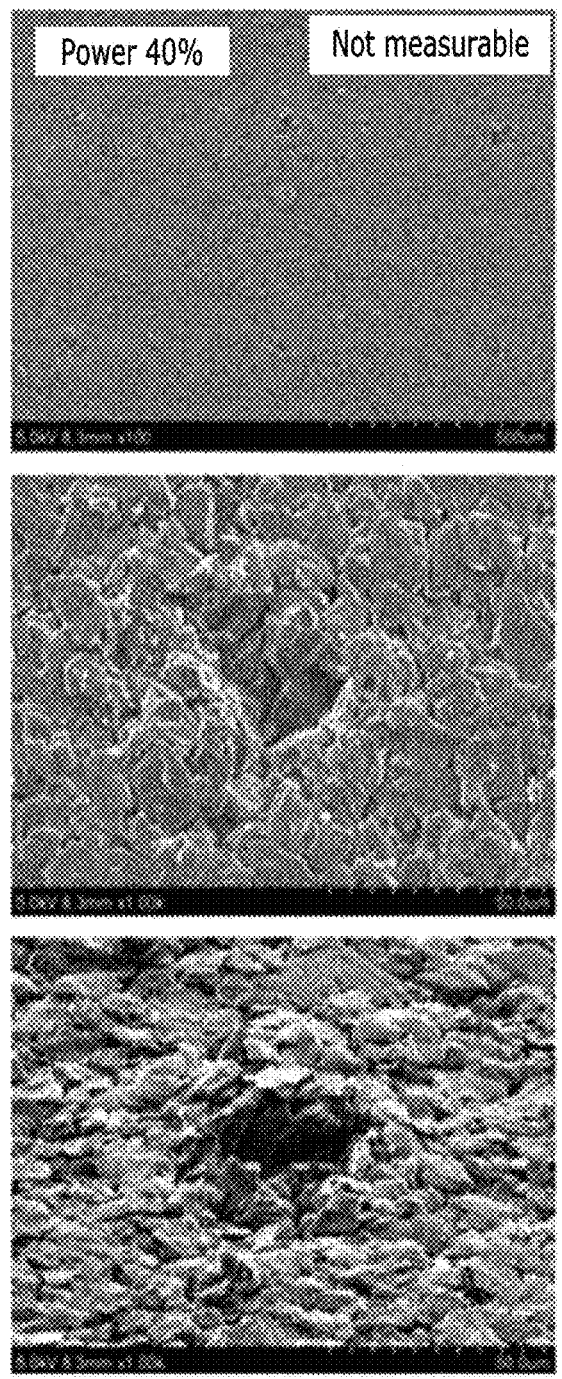
FIG. 9 is plan-view SEM images of the positive electrode of Comparative Example 3 according to Experimental Example 2.
Figure 10:
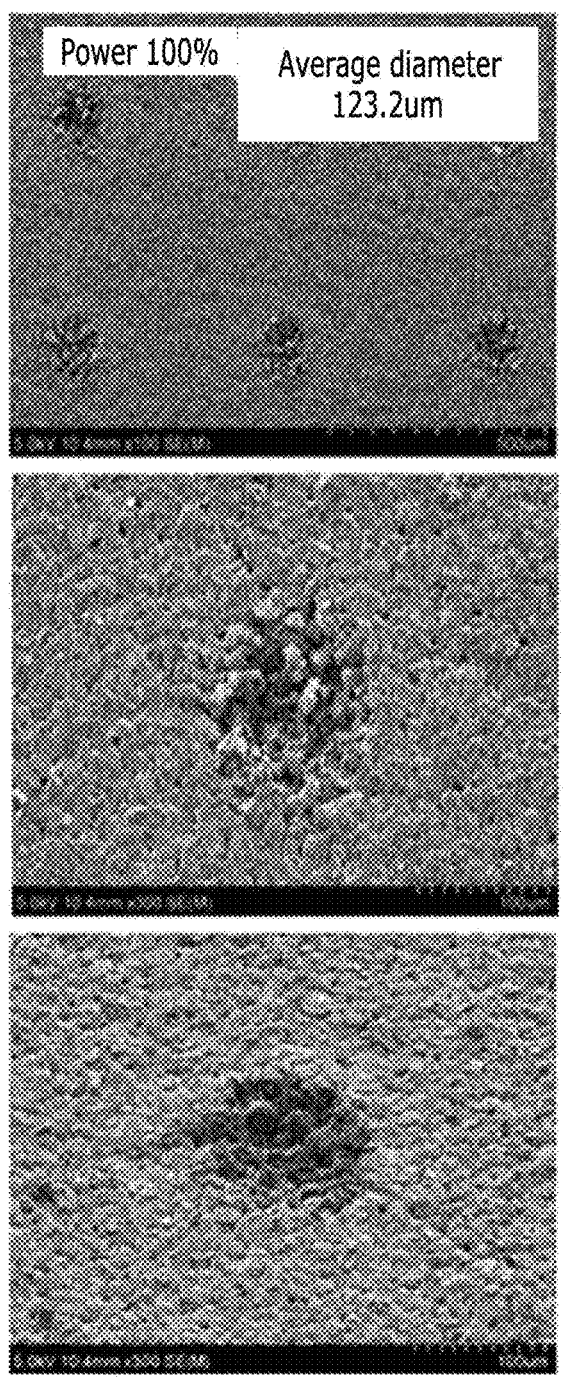
FIG. 10 is plan-view SEM images of the positive electrode of Comparative Example 4 according to Experimental Example 2.
Figure 11:
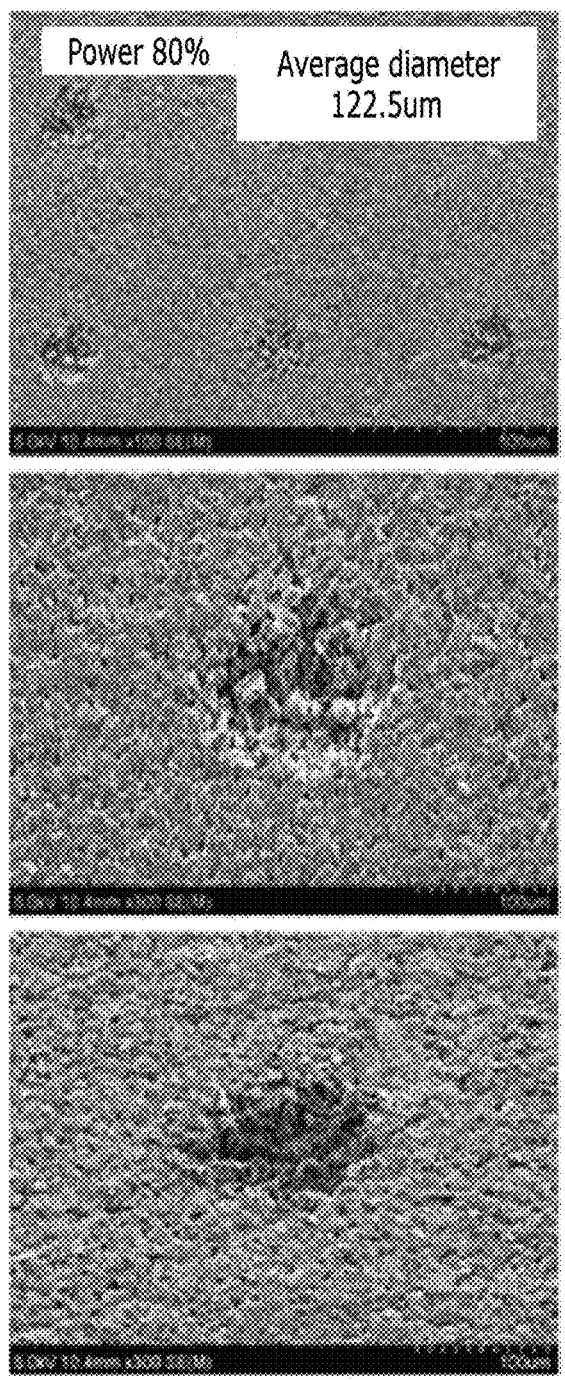
FIG. 11 is plan-view SEM images of the positive electrode of Comparative Example 5 according to Experimental Example 2.
Figure 12:
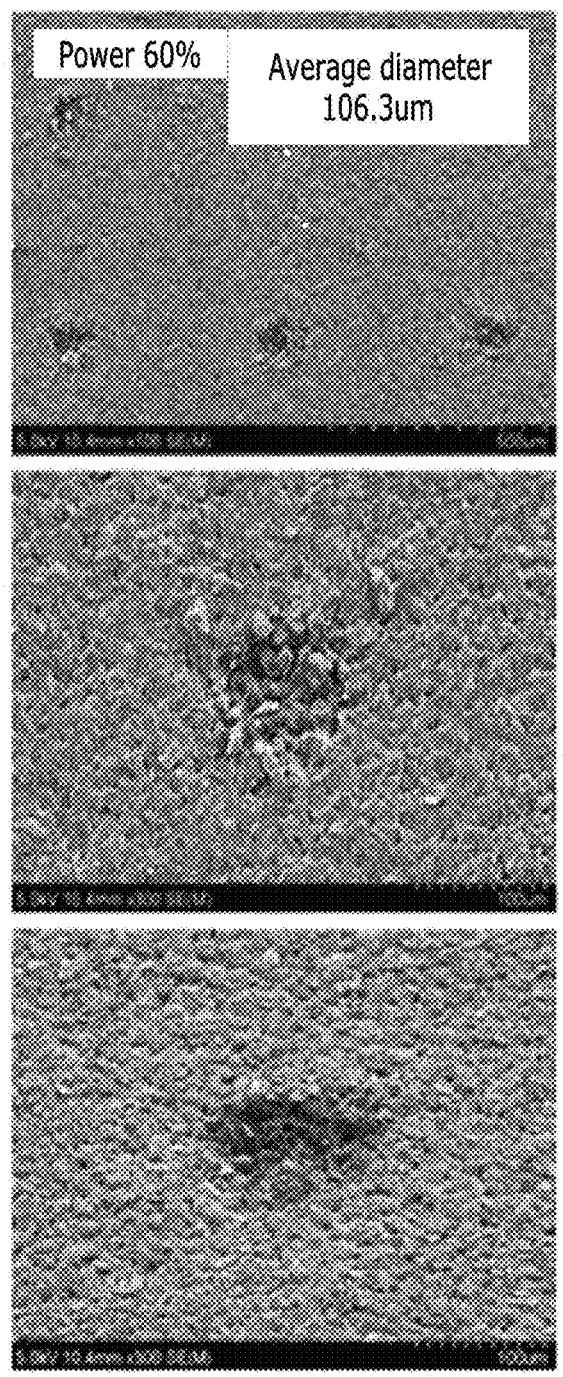
FIG. 12 is plan-view SEM images of the positive electrode of Comparative Example 6 according to Experimental Example 2.

Referring to FIGS. 3 to 5, it can be seen that as the interval between holes is smaller, the hole diameter and depth are larger (Comparison of Example 1 and Example 2). On the other hand, when the laser is irradiated several times (Comparative Example 1), it can be seen that the diameter of the hole rises sharply, but compared to this, the additional processing is slight in the depth.

Example 3

A negative electrode was manufactured by forming the holes in the same manner in Example 1, except that the interval between the holes was set to 500 μm.

Example 4

A negative electrode was manufactured by forming the holes in the same manner in Example 1, except that the interval between the holes was set to 500 μm and the average power of the laser was set to 40 W (80%).

Example 5

A negative electrode was manufactured by forming the holes in the same manner in Example 1, except that the interval between the holes was set to 500 μm and the average power of the laser was set to 30 W (60%).

Comparative Example 2

A negative electrode was manufactured by forming the holes in the same manner in Example 1, except that the interval between the holes was set to 500 μm and the average power of the laser was set to 20 W (40%).

Comparative Example 3

The negative electrode mixture of the preliminary negative electrode manufactured in the previous Production Example was irradiated once at 100 μm intervals by using a picosecond laser (TruMicro 5050, 1030 nm) and setting the following conditions to form a plurality of holes, thereby manufacturing a negative electrode
  Average Power: 50 W (100% power),
  Repetition Rate: 200 kHz
  Pulse Duration: 10 ps,
  Pulse Energy: 0.71 mJ
  Laser Irradiation Time: 1 μs,
  Wavelength: 1030 nm Comparative Example 4

A negative electrode was manufactured by forming the holes in the same manner in Comparative Example 3, except that the average power of the laser was set to 40 W (80%).

Comparative Example 5

A negative electrode was manufactured by forming the holes in the same manner in Comparative Example 3, except that the average power of the laser was set to 30 W (60%).

Experimental Example 2

Plan-view SEM images of the negative electrodes manufactured in Examples 3 to 5 and Comparative Examples 2 to 5 were taken, and shown in FIGS. 6 to 12 in order.

Referring to FIGS. 6 to 12, in the case of manufacturing the electrode according to the present disclosure, holes are properly formed with an average diameter of 50 μm or less, whereas when the average power is too low even if the nanosecond is used, holes are not formed properly. In the case of using the picosecond, the diameter of the hole became larger than 100 μm, which is thus not appropriate.

Example 6

A negative electrode was manufactured by forming the holes in the same manner in Example 1, except that the interval between the holes was set to 150 μm.

Comparative Example 6

A negative electrode was manufactured under the same condition in Example 1, except that a nanosecond laser was used to form line-shaped grooves instead of holes, and the interval was set to 100 μm.

Comparative Example 7

A negative electrode was manufactured under the same condition in Example 1, except that a nanosecond laser was used to form line-shaped grooves instead of holes, and the interval was set to 150 μm.

Comparative Example 8

A negative electrode was manufactured under the same condition in Example 1, except that a nanosecond laser was used to form line-shaped grooves instead of holes and the interval was set to 200 μm.

Experimental Example 3

Figure 13:
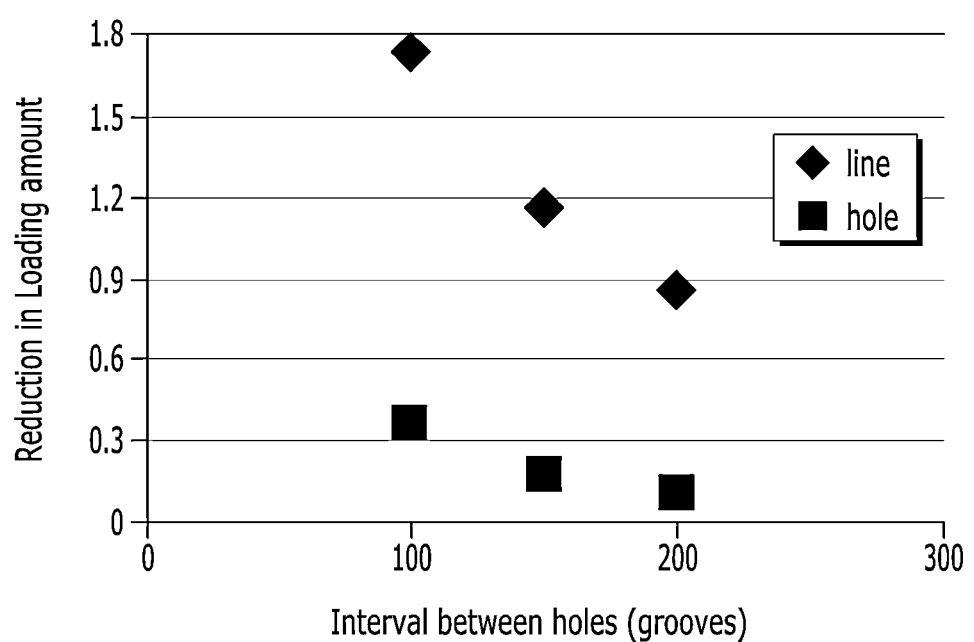
FIG. 13 is a graph for comparing the reduction in loading amount according to Experimental Example 3.

The reduction rate of the loading amount was measured for the negative electrode of Examples 1, 2, 6, and Comparative Examples 6 to 8 as compared with the case where no hole or line-shaped groove was formed, and is shown in FIG. 13.

The reduction rate of the loading amount was determined by measuring the weight before and after laser treatment, removing the active material, and measuring the weight of the Cu foil, and calculating the equation of (active material weight before laser treatment-active material weight after treatment)/active material weight before laser treatment.

Referring to FIG. 13, when the groove is formed in the shape of a line, it can be seen that the loading amount decreases sharply by that extent.

In this case, the capacity decreases as the loading amount decreases, which is thus not preferable, and in the case of forming in a groove shape, the reduction in the loading amount is minimized, which is thus preferable.

Example 7

The negative electrode (hole average diameter: 50 μm, hole average depth: 34 μm) manufactured in Example 1 was used.

LiCoO$_2$ was used as an active material, PVDF and SBRd were used as a binder, and carbon black was used as a conductive material. Electrode active material:binder:conductive material were added in a weight ratio of 97.6:1.2:1.2 to water to obtain an electrode active material slurry, and the obtained slurry was coated onto an Ai foil current collector in a thickness of about 110 μm and a loading amount of 500 mg/25 cm$^2$, dried, and then rolled to manufacture a positive electrode having a positive electrode mixture formed therein.

A separator (Cell Guard) was interposed between the positive electrode and the negative electrode, and an electrolyte solution containing 1.2M LiPF$_6$ was used in a solvent of EC:PC:PP=3:1:6 (vol %) to manufacture a pouch type secondary battery. Three batteries were prepared.

The holes formed in the negative electrode had an average diameter of about 50 μm and an average depth of about 34 μm.

Example 8

Three secondary batteries were manufactured in the same manner as in Example 7, except that the negative electrode manufactured in Example 2 was used.

The holes formed in the negative electrode had an average diameter of about 40 μm and an average depth of about 24 μm.

Comparative Example 9

The secondary battery was manufactured in the same manner as in Example 7, except that the negative electrode manufactured in Comparative Example 1 was used. Three batteries were prepared.

The holes formed in the negative electrode had an average diameter of about 60 μm and an average depth of about 26 μm.

Comparative Example 10

The secondary battery was manufactured in the same manner as in Example 7, except for using the preliminary negative electrode having no holes formed herein manufactured in the previous Preparation Example. Three batteries were prepared.

Experimental Example 4

The secondary batteries manufactured in Examples 7, 8 and Comparative Examples 9 and 10 were charged at 1 C up to 4.2V under constant current/constant voltage (CC/CV) conditions, and then discharged at ⅓ C up to 3.4 V under constant current (CC) conditions. The discharge capacity was measured, and the results are shown in FIG. 14 below.

Also, the secondary batteries manufactured in Examples 7, 8 and Comparative Example 10 were sampled, and charged at ⅓ C, ½ C, 1 C, 1.5 C, 2 C up to 4.2V under constant current/constant voltage (CC/CV) conditions, respectively, and then discharged at ⅓ C up to 3.4 V under the constant current (CC) condition. The discharge capacity according to C-rate was measured, and the results are shown in FIG. 15 below.

Figure 14:
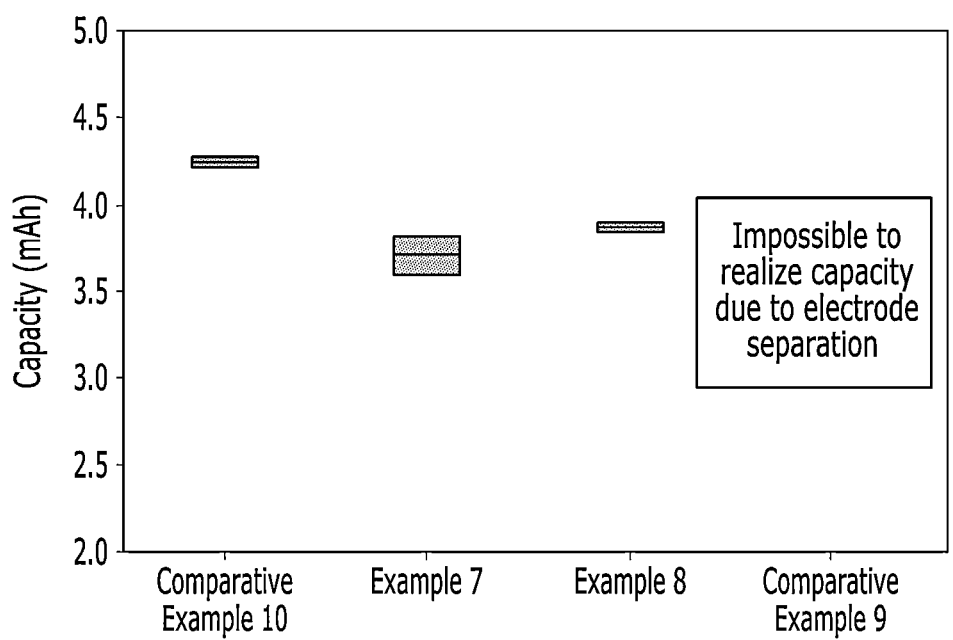
FIG. 14 is a graph for comparing the initial discharge capacity according to Experimental Example 4.
Figure 15:
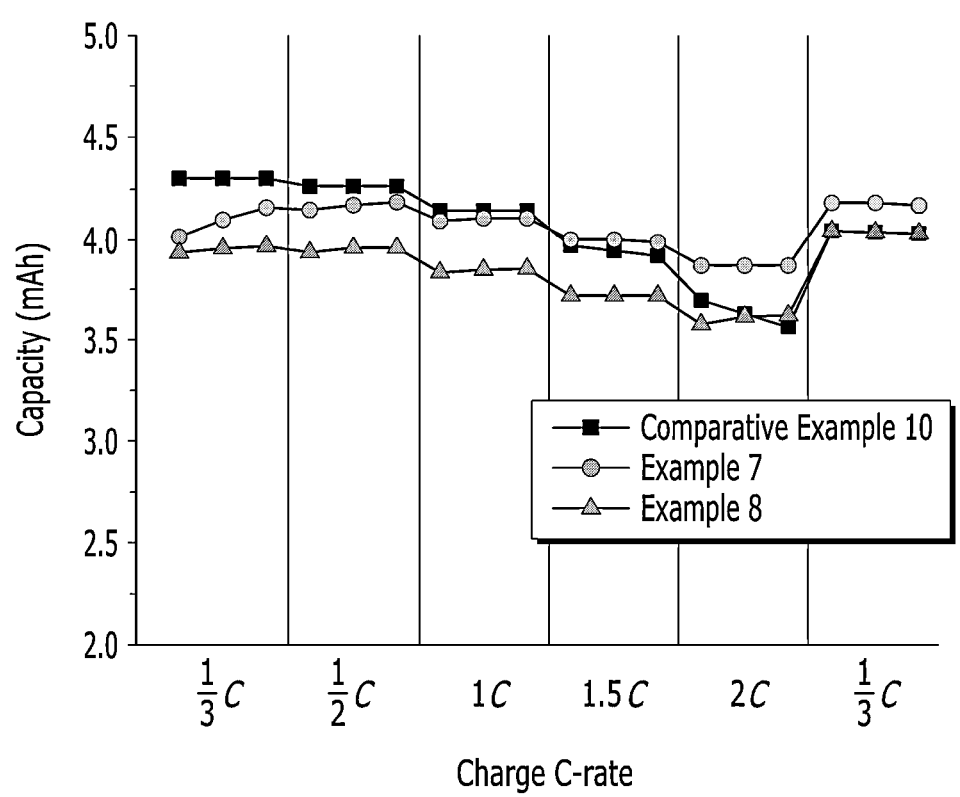
FIG. 15 is a graph for comparing the discharge capacity versus C-rate according to Experimental Example 4.

Referring to FIGS. 14 and 15 together, in the case of using the electrode according to the present disclosure having the holes formed therein, it can be seen that one cycle discharge capacity was reduced by a small amount, but at 1.5 C or more, it starts to show improved power performance compared to Comparative Example 10, and at 2 C, it shows more excellent high rate characteristics.

On the other hand, in Comparative Example 9, the diameter of the pattern was increased by performing irradiation 3 times, and the capacity could not be realized due to the occurrence of voltage abnormality or the like in all secondary batteries due to the separation of the electrode.

DESCRIPTION OF REFERENCE NUMERALS

100: electrode manufacturing apparatus,
101: sheet type current collector,
102: electrode active material slurry,
110: unwinder,
120: transfer unit,
130: coating unit,
140: drying unit,
150: rolling unit,
160: laser unit,
170: rewinder.

The invention claimed is:

1. An apparatus for manufacturing an electrode for a secondary battery, comprising:
    a roller-shaped unwinder on which a sheet type current collector is wound;
    a transfer roller configured to continuously transfer the sheet type current collector;
    a coater configured to coat an electrode active material slurry on at least one surface of the sheet type current collector;
    a dryer configured to dry the coated electrode active material slurry to form an electrode mixture on at least one surface of the sheet type current collector;
    a roller configured to roll the electrode mixture through a pair of rollers;
    a laser adapted to subject the electrode mixture to laser etching to form a plurality of holes having thicknesses, thereby manufacturing an electrode sheet; and,
    a roller-shaped rewinder configured to rewind the electrode sheet,
    wherein the laser is a nanosecond laser, and is adapted to form respective holes by performing irradiation twice or less,
    wherein the nanosecond laser satisfies the following conditions 1 to 4:
    [Condition 1]
    Average Power: 26 W to 100 W,
    [Condition 2]
    Repetition Rate: 28 kHz to 70 kHz,
    [Condition 3]
    Pulse Duration: 55 ns to 220 ns,
    [Condition 4]
    Pulse Energy: 0.28 mJ to 2.84 mJ.

2. The apparatus for manufacturing an electrode according to claim 1,
    wherein the transfer roller is configured to transfer the sheet type current collector at a speed of 40 m/min to 80 m/min.

3. The apparatus for manufacturing an electrode according to claim 1, wherein the plurality of holes have a conical shape whose diameter decreases in a direction of the sheet type current collector from a surface portion of the electrode mixture.

4. The apparatus for manufacturing an electrode according to claim 1,
wherein the plurality of holes have a diameter at a surface portion of the electrode mixture and a depth in a direction of the sheet type current collector from the surface portion of the electrode mixture in a ratio of 1:1 to 2:1.

5. The apparatus for manufacturing an electrode according to claim 1,
wherein the plurality of holes have a diameter of 10 μm to 50 μm at a surface of the electrode mixture, and an interval between respective holes is from 100 μm to 500 μm.

6. The apparatus for manufacturing an electrode according to claim 1, wherein the laser further includes a polygon mirror and is configured to etch through the polygon mirror at the time of laser etching.

7. A method for manufacturing an electrode for a secondary battery, the method comprising:
(a) preparing an electrode slurry containing an active material;
(b) coating the electrode slurry onto at least one surface of a sheet type current collector to be transferred, and drying the same to form an electrode mixture, and rolling the electrode mixture; and
(c) subjecting the electrode mixture to laser etching to form a large number of holes having a level difference in thickness, thereby manufacturing an electrode sheet;
wherein the laser etching (c) performs irradiation twice or less with a nanosecond laser to form respective holes; and wherein the nanosecond laser satisfies the following conditions 1 to 4:
[Condition 1] Average Power: 26 W to 100 W,
[Condition 2] Repetition Rate: 28 kHz to 70 kHz,
[Condition 3] Pulse Duration: 55 ns to 220 ns,
[Condition 4] Pulse Energy: 0.28 mJ to 2.84 mJ.

8. The method for manufacturing an electrode according to claim 7,
wherein the sheet type current collector is transferred at a speed of 40 m/min to 80 m/min.

9. The method for manufacturing an electrode according to claim 7,
wherein the holes are formed in a conical shape whose diameter decreases in a direction of the sheet type current collector from a surface portion of the electrode mixture, and
a diameter at the surface portion of the electrode mixture and a depth in the direction of the sheet type current collector from the surface portion of the electrode mixture are formed in a ratio of 1:1 to 2:1.

10. The method for manufacturing an electrode according to claim 7,
wherein the holes are formed such that a diameter at a surface of the electrode mixture is 10 μm to 50 μm, and an interval between respective holes is 100 μm to 500 μm.

11. The method for manufacturing an electrode according to claim 7,
wherein during the laser etching (c), a polygon mirror is used.

12. An electrode for a secondary battery, comprising:
an electrode mixture formed on at least one surface of a sheet type current collector, and
a large number of conical-shaped holes formed in the electrode mixture so as to form a level difference in thickness,
wherein a diameter of the holes at a surface portion of the electrode mixture and a depth of the holes in a direction of the sheet type current collector from the surface portion of the electrode mixture are in a ratio of 1:1 to 2:1, and
wherein the electrode is manufactured by the method of claim 7.

13. The electrode according to claim 12, wherein the diameter at the surface portion of the electrode mixture of the holes is 10 μm to 50 μm, and an interval between the respective holes is 100 μm to 500.

* * * * *